United States Patent [19]

Cassidy et al.

[11] Patent Number: 4,935,460

[45] Date of Patent: Jun. 19, 1990

[54] REACTION INJECTION MOLDING COMPOSITIONS

[75] Inventors: Edward F. Cassidy, Ukkel; Herbert R. Gillis, Sterrebeek; Malcolm Hannaby, Leuven; Jan W. Leenslag, Neerijse; Alain Parfondry, Evere, all of Belgium

[73] Assignees: ICI Americas Inc.; Imperial Chemical Industries PLC, Wilmington, Del.

[21] Appl. No.: 378,445

[22] Filed: Jul. 7, 1989

Related U.S. Application Data

[63] Continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[51] Int. Cl.$^5$ .............................................. C08G 18/14
[52] U.S. Cl. .............................. 524/251; 252/182.18; 521/163; 528/44; 528/59; 528/73; 528/75; 528/78; 560/172
[58] Field of Search .................... 252/182.18; 524/251; 521/163; 528/44, 59, 73, 75, 78; 560/172

[56] References Cited

U.S. PATENT DOCUMENTS

| | | | |
|---|---|---|---|
| 3,240,842 | 3/1966 | Saunders | 260/77.5 |
| 3,420,800 | 1/1969 | Haggis | 260/75 |
| 3,441,588 | 4/1969 | Wagner et al. | 260/453 |
| 3,865,791 | 2/1975 | Brinkmann et al. | 260/77.5 |
| 3,941,753 | 3/1976 | Brinkmann et al. | 260/77.5 |
| 4,108,842 | 8/1978 | Konig et al. | 528/61 |
| 4,224,417 | 9/1980 | Hajek et al. | 521/166 |
| 4,336,180 | 6/1982 | Recker et al. | 524/847 |
| 4,338,428 | 7/1982 | Alberino et al. | 528/73 |
| 4,342,841 | 8/1982 | Alberino et al. | 521/163 |
| 4,433,067 | 2/1984 | Rice et al. | 521/51 |
| 4,444,910 | 4/1984 | Rice et al. | 521/51 |
| 4,469,875 | 9/1984 | John | 528/59 |
| 4,552,945 | 11/1985 | Alberino et al. | 528/62 |
| 4,554,299 | 11/1985 | Liggett | 523/466 |
| 4,774,263 | 9/1988 | Weber et al. | 521/51 |
| 4,774,264 | 9/1988 | Weber et al. | 521/51 |
| 4,794,126 | 12/1988 | Gillis, Jr. et al. | 521/121 |

*Primary Examiner*—Maurice J. Welsh
*Attorney, Agent, or Firm*—Richard A. Rowe

[57] ABSTRACT

An isocyanate-reactive polymer comprising the reaction product of:

(a) an isocyanate-terminated polyurethane prepolymer formed by reacting a polymeric polyol having a hydroxyl equivalent weight of at least 500 with a stoichiometric excess of an organic polyisocyanate, and (b) a stoichiometric excess, relative to the free isocyanate groups present in the prepolymer, of an imino-functional or enamine-containing compound having a molecular weight less than about 750.

6 Claims, No Drawings

4,935,460

REACTION INJECTION MOLDING COMPOSITIONS

This is continuation of copending application Ser. No. 242,745 filed on Sept. 9, 1988 now abandoned which is a continuation-in-part of copending application Ser. No. 160,647 filed Feb. 26, 1988 now U.S. Pat. No. 4,794,129 which is a continuation-in-part of application Ser. No. 105,641 filed Oct. 6, 1987 abandoned.

FIELD OF THE INVENTION

This invention relates to isocyanate-reactive polymers and to reaction systems used to make foams, polymers, and moldings by a reaction injection molding (RIM) process.

BACKGROUND OF THE INVENTION

Reaction injection molded polyurea elastomers currently define an advanced state of the art in RIM technology. These polymeric materials are molded from reaction systems which generally consist of two components, a polyisocyanate (which is usually aromatic), and a mixture of aromatic and aliphatic polyamines. The polyureas represent a major technological advance over earlier types of RIM systems (i.e. polyurethanes, urethane ureas, and polyamides) in that they offer a combination of superior material properties (i.e. heat resistance, moisture resistance, dimensional stability), with improved productivity (i.e. shorter mold-residence times).

Conventional polyurea reaction injection molding (RIM) elastomer formulations are well known to the art. See, for example, U.S. Pat. Nos. 4,433,067, 4,396,729, 4,474,901, 4,444,910, 4,448,904, and European published patent application No. 0081701.

These polyurea RIM systems are "fast" systems in that they tend to gel early. They do not fill large, geometrically complex molds without very high injection rates. Because of the fast gel times flow/fill problems frequently arise and can be particularly severe with formulations having theoretical hardblock levels above about 35% and containing primary aliphatic amines in the formulation. In particular, formulations above 35% hardblock which contain aliphatic amine-terminated polyether resins as the source of the softblock, or as added chain extenders, can present difficult processing problems. Formulations containing such aliphatic amine-terminated polyether resins are widely used in state of the art polyurea RIM technology.

In general, state-of-the-art polyurea systems which contain primary aliphatic amine groups exhibit poorer flow/fill characteristics than older prior art polyurethane-urea RIM systems, such as that described in U.S. Pat. No. 4,218,543. These older systems are similar to state-of-the-art polyurea systems in that they contain a sterically hindered aromatic diamine as a principal chain extender, but they do not generally require or contain primary aliphatic amine-containing species. Consequently not only do these older prior art systems exhibit better flow-fill characteristics, they generally also exhibit better mixing and are usually less demanding to process than current generation polyurea systems (i.e., when compared under similar conditions and at the same hardblock levels).

Conversely, apart from the disadvantages described above, state-of-the-art polyurea systems have several advantages over prior art polyurethane-urea systems. In particular they generally exhibit lower mold residence times, hence better productivity, and better physical properties can be obtained with the polyureas. In addition, the polyureas are more "robust", i.e. they can tolerate acidic additives because they do not depend upon sensitive catalysts as do the polyurethaneureas. The polyureas, as known in the art, are distinguished from the polyurethaneureas most fundamentally by the fact that substantially no urethane linkages are formed during the reaction injection molding (RIM) operation.

It would be desirable to have polyurea RIM systems which exhibit flow-fill and mixing characteristics which are better than those of existing polyureas and, preferably, at least comparable to prior-art polyurethaneurea systems. Speaking more generally, it would be highly desirable to have RIM processable reaction systems which offer at least some of the advantages of polyureas (i.e. heat resistance, robustness, short mold-residence times), without the disavantages characteristic of the known polyurea systems (poor flow).

It would be preferable, however, that this improvement in flow not be achieved at the expense of much longer mold residence times. The requirements for improved flow/fill characteristics and constant mold-residence time are mutually contradictory unless the reaction profile of such systems is changed. Simply reducing reactivity tends to decrease the flow/fill problems which naturally stem from the fast gel times of state-of-the-art polyurea systems, but also disadvantageously tends to increase the minimum necessary mold residence time.

State-of-the-art polyurea systems are faster than the earlier polyurethane-urea systems for a number of reasons, one being, as mentioned, the presence of fast-reacting primary aliphatic amine species which can react with aromatic isocyanates more than 100 times faster than aromatic amine chain extenders, such as diethyl toluene diamine, DETDA, normally used in polyurea and polyurethane urea RIM systems. State of the art polyureas generally have a higher cohesive energy density (CED), hence higher Tg, than corresponding polyurethaneureas of the prior art. The higher CED, coupled with higher chemical reactivity, make the polyureas gel faster than polyurethaneureas. Often the gels which are first formed are physical rather than chemical gels. Physical gelation can be particularly problematic in polyurea systems which contain relatively high concentrations of aliphatic amine species, especially lower molecular weight aliphatic amine species. In polyurea systems which form distinct two-phase elastomers, phase separation may further interfere with flow/fill and mixing. Phase separation can occur very early if reactivity is high.

SUMMARY OF THE INVENTION

This invention provides imine-terminated and/or enamine-terminated polymers, useful in the production of Reaction Injection Molding (RIM) elastomers and other products, which can be prepared by simple reactions from relatively inexpensive starting materials.

This invention further provides a method for the preparation of polymeric foams which comprises reacting an organic polyisocyanate under foam-forming conditions with an imino-functional or enamine-containing compound having a molecular weight of at least 1000.

This invention further provides reaction systems for use in making polymers by a RIM process, said systems comprising (A) an organic polyisocyanate and (B) an isocyanate-reactive composition comprising at least one enamino-functional compound.

This invention further provides a reaction system for use in making a RIM elastomer, said system comprising (A) a certain isocyanate-functional prepolymer and (B) an isocyante-reactive component comprising an imino-functional compound and/or an enamine-containing compound.

This invention further provides polymers and molded articles made therefrom using the reaction systems and isocyanate-reactive compositions noted above.

"Imino-functional" as used herein means that a reactant contains the imino group

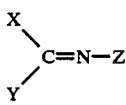

as hereinafter further defined wherein said group is capable of reacting directly with isocyanate groups. Preferred classes of imino-functional groupings include imines, oxazolines, imidazolines, N-alkyl imidazolines, oxazines, diazines, imino-esters, amidines, imidines, isoureas and guanidines, as hereinafter further defined.

The range of imino functional reagents which may be used in the invention are not limited by or to any particular chemistry for the preparation of said reagents. For example, imine terminated aliphatic polyethers may be made by a number of different routes. Specifically, the amine groups (—NH$_2$) of an aliphatic amine-terminated polyether can be prereacted with an aldehyde (RCH$_2$CHO) or a ketone (R$^1$—CO—R$^2$) to form, respectively, the corresponding aldimine

or the corresponding ketimine

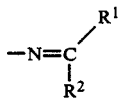

wherein R, R$^1$, and R$^2$ are hereinafter subsequently defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

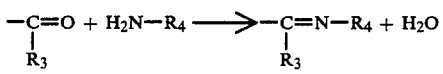

wherein: R$_3$=H or alkyl, R$_4$=H or alkyl, R$_3$ and R$_4$ being more fully defined hereinafter.

The direct reaction of compounds containing isocyanate groups with compounds containing imine groups is known, see "New Developments in Polyketimine-Polyisocyanate Chemistry and Their Application"; ACS-PMSE preprints; Fall-1986 meeting; pp 448–456, U.S. Pat. No. 3,789,045 and GB Pat. No. 1286246. It is also known to react polyisocyanates with polyamines in a reaction moderating solvent such as ketone or aldehyde solvents, see U.S. Pat. No. 3,892,696 to Wood and U.S. Pat. No. 3,897,585 (also to Wood) which is a continuation-in-part thereof. It is also known to react aliphatic polyisocyanates with mixtures of polyamines and polyimines as disclosed in U.S. Pat. No. 4,554,299 to Ligget. It is also well known to react polyisocyanates with polyimines in the presence of moisture whereby the purpose of the moisture is to hydrolyze the imine and liberate free amine which in turn reacts with the isocyanate present. This indirect process of reacting polyimines and polyisocyanates is described, for example, in European Pat. No. 149,765 to Arendt.

DETAILED DISCUSSION

In a first aspect, the present invention provides an isocyanate-reactive polymer comprising the reaction product of:

(a) an isocyanate-terminated polyurethane prepolymer formed by reacting a polymeric polyol having a hydroxyl equivalent weight of at least 500 with a stoichiometric excess of an organic polyisocyanate, and (b) a stoichiometric excess, relative to the free isocyanate groups present in the prepolymer, of an imino-functional or enamine-containing compound having a molecular weight less than about 750.

Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Organic polyisocyanates which may be used in the preparation of the isocyanate-terminated polyurethane prepolymers include aliphatic, cycloaliphatic, araliphatic and aromatic polyisocyanates, for example hexamethylene diisocyanate, isophorone diisocyanate, cyclohexane-1,4-diisocyanate, dicyclo-hexylmethane-4,4-diisocyanate, p-xylylene diisocyanate, phenylene diisocyanates, tolylene diisocyanates, 1,5-naphthylene diisocyanate and the available MDI isomers, that is to say 4,4'-diphenylmethane diisocyanate, 2,4'-diphenylmethane diisocyanate and mixtures thereof. Whilst diisocyanates are the preferred polyisocyanates for use in the preparation of prepolymers, mixtures of diisocyanates with minor proportions of higher functionality polyisocyanates may be used if desired although the viscosities of the resulting prepolymers will then generally be higher. Unsymmetrical diisocyanates such as 2,4-tolylene diisocyanate and isophorone diisocyanate are useful for minimising chain extenders.

Polymeric polyols which may be used in the preparation of the isocyanate-terminated polyurethane prepolymers typically have average nominal hydroxyl functionalities of from 2 to 5 and average hydroxyl equivalent weights in the range 750 to 5000. Preferred polymeric polyols have average nominal hydroxyl functionalities of 2 or 3 and average hydroxyl equivalent weights in the range from about 1000 to about 3000. Suitable polyols and methods for their preparation have been fully described in the prior art. As examples of suitable polyols, there may be mentioned polyesters, polyesteramides, polythioethers, polycarbonates, polyacetals, polyolefins, hydrocarbons, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Polyoxypropylene diols and/or triols are most preferred. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained from thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-dexanediol, diethylene glycol or tetraethylene glycol with diaryl carbonates, for example diphenyl carbonate, cyclic carbonates or phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

In preparing the isocyanate-terminated polyurethane prepolymers, the polyisocyanate and the the polyol may be reacted together using conditions that have been fully described in the prior art for the production of prepolymers.

Thus, one or more polyisocyanates may be reacted with one or more polyols under substantially anhydrous conditions at temperatures between about 50° and about 180° C., optionally in the presence of catalysts, until reaction between the isocyanate groups and the hydroxyl groups is substantially complete. Suitable catalysts are known in the polyurethane art and include tin compounds such as dibutyltin dilaurate and tertiary amines such as triethylene diamine. It is preferable to avoid those catalysts which, under the conditions of prepolymer formation, promote competing isocyanate reactions such as trimerisation.

The excess of organic polyisocyanate used in preparing the prepolymers is suitably such that the prepolymers have free NCO contents in the range from about 0.3 to about 10%, preferably from about 2 to about 4% by weight.

Imino-functional compounds which may be reacted with the isocyanate-terminated prepolymers to form the isocyanate-reactive polymers of the invention contain at least one isocyanate-reactive imino group per molecule and conform to the general structure:

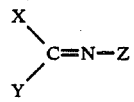

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

Many types of imino-functional compounds are useful in this invention, including (but not limited to) those listed in Table A, following:

TABLE A

| | TYPE |
|---|---|
|  | Simple imine |
|  | Imino ester |
|  | Imino ester (aromatic) |
|  | Simple imine |
|  | Amidine |
|  | Simple imine (aromatic) |

TABLE A-continued

| | TYPE |
|---|---|
| 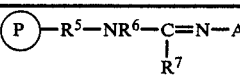 Ⓟ—R⁵—NR⁶—C=N—Ar'<br>　　　　　　　｜<br>　　　　　　　R⁷ | Amidine (aromatic) |
| 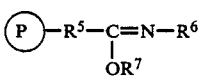 Ⓟ—R⁵—C=N—R⁶<br>　　　　｜<br>　　　　OR⁷ | Imino ester (aliphatic) |
| 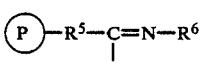 Ⓟ—R⁵—C=N—R⁶<br>　　　　｜<br>　　　　OAr' | Imino ester (aromatic) |
| 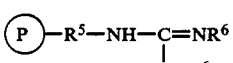 Ⓟ—R⁵—NH—C=NR⁶<br>　　　　　　　｜<br>　　　　　　　NHR⁶ | Guanidine |
|  Ⓟ—R⁵—NR⁷—C⟨NR⁸ / NR₂⁸ | Guanidine |
|  Ⓟ—R⁵—NH—C=NAr'<br>　　　　　　　｜<br>　　　　　　　NHAr' | Guanidine (aromatic) |
|  Ⓟ—R⁵—O—C=N—R⁶<br>　　　　　　｜<br>　　　　　　NHR⁶ | Isourea |
| 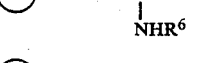 Ⓟ—R⁵—O—C=N—R⁷<br>　　　　　　｜<br>　　　　　　NH₂ | Isourea | wherein:

$R^5$ and Ar are divalent aliphatic and aromatic organic linking groups, respectively;

Ⓟ represents a organic chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature. Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above.

Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London. 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

Suitable imino-functional compounds contain from one to four, preferably from one to three and most preferably two imino units per molecule although this will depend upon the use to which the isocyanate-reactive polymer is to be put.

Preferred compounds for use in making the isocyanate-reactive polymer have molecular weights in the range from about 57 to about 749.

Examples of preferred imino-functional compounds include simple aldimines and/or ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, methyl n-propyl ketone, methyl isopropyl ketone, diethyl ketone, benzyl methyl ketone or cyclo-hexanone and mixtures thereof with primary amines, especially aliphatic diamines including particularly unsymmetrical diamines. Examples of suitable amines include hexamethylene diamine, menthane diamine, isophorone diamine, xylylene diamine, 2-methylpentamethylene diamine, polyoxyalkylene diamines and/or triamines and mixtures of such amines. Primary mono-amines may also be used either alone or together with diamines.

Enamine-containing compounds which may be reacted with the isocyanate-terminated prepolymers to form the isocyanate-reactive polymers of the invention include compounds having the structures:

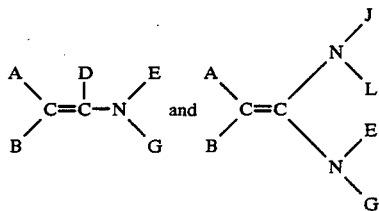

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

In preferred enamino-functional compounds, E, G, J and L are not hydrogen. It is also preferred that not both of A and B are hydrogen. Examples of enamino-functional compounds contain two or more enamino groups as a result of any of A, B, D, E, G, J and/or L being a radical terminating in one or more enamino groups. Mono-enamines and mixtures of mono with di-enamines are also suitable.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproalde-hyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazine or secondary amino-terminated low molecular weight polymers such as low molecular weight polyethers.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945. Unsymmetrical di-imines or di-enamines are useful for minimising chain extension.

Reaction between the isocyanate-terminated polyurethane prepolymers and the imino-functional or enamine-containing compounds to form the isocyanate-reactive polymers of the invention may be effected by simple mixing at ambient temperatures but lower or higher reaction temperatures may be employed if desired. In one convenient method, the prepolymer is added to an excess of the low molecular weight imino-functional or enamine-containing compound. Solvents may be employed but are preferably avoided. The excess of imino-functional or enamine groups should preferably be such as to provide at least about one mole of imino-functional or enamine-containing compound per isocyanate equivalent, the product then being an isocyanate-reactive composition containing an isocyanate-reactive polymer having terminal imino-functional or enamine groups or intermediate reaction products thereof and unreacted imino-functional or enamine-containing compound having a molecular weight less than about 750. If desired, the unreacted imino-functional or enamine-containing compound may be removed under reduced pressure, for example by using a thin film evaporator, leaving the isocyanate-reactive polymer which may be used directly or in combination with other isocyanate-reactive materials.

The viscosities of the isocyanate-reactive compositions may be controlled by appropriate selection of the type and amount of the imino-functional or enamine-containing compound used. It is preferred that such isocyanate-reactive compositions have viscosities not exceeding 6000 centipoises at the processing temperature used. It is most preferred that the viscosities do not exceed 4000 centipoises at 25° C.

The isocyanate-reactive polymers and isocyanate-reactive compositions of the invention may be reacted with organic polyisocyanates using techniques and items of processing equipment that have been fully described in the prior art so as to form useful cellular or non-cellular macromolecular materials.

The isocyanate-reactive compositions of the invention are of particular value in the production of moulded elastomers by the RIM technique, the compositions being reacted as "B" components, optionally in conjunction with other conventional ingredients, for example aromatic diamines, with conventional "A" components, that is to say organic polyisocyanates.

Thus, in a further aspect of the present invention, there is provided a reaction system for use in making a reaction injection moulded elastomer, said system comprising the following components:

(A) an organic polyisocyanate, and
(B) an isocyanate-reactive component comprising:
  (i) an isocyanate-reactive composition comprising the reaction product of:
    (a) an isocyanate-terminated polyurethane prepolymer formed by reacting a polymeric polyol having a hydroxyl equivalent weight of at least 500 with a stoichiometric excess of an organic polyisocyanate, and
    (b) at least one mole, relative to the free isocyanate groups present in the prepolymer, of an imino-functional or enamine-containing compound having a molecular weight less than about 750, and
  (ii) a chain extender comprising an aromatic polyamine containing two or three aromatically bound primary and/or secondary amino groups and having a molecular weight of from about 100 to about 400.

Organic polyisocyanates which may be present in Component A of the reaction systems of the invention include the aliphatic, cycloaliphatic, araliphatic and, especially, the aromatic polyisocyanates mentioned above in relation to the preparation of the isocyanate-terminated polyurethane prepolymer. The preferred polyisocyanates include the aforementioned MDI isomers as well as polymeric (crude) MDI and MDI variants wherein the MDI has been modified by the introduction of urethane, allophanate, urea, biuret, amide, carbodiimide, uretonimine or isocyanurate residues.

Particularly useful polyisocyanates include isocyanate-terminated prepolymers prepared by reacting MDI with polymeric polyols and/or polyamines and also polyol-based prepolymers in which at least 20% of the initially formed urethane groups have been converted to allophanate groups.

Aromatic polyamines useful as chain extenders in the reaction systems of the invention particularly include diamines, especially those having molecular weights between 122 and 300.

Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5,5'-diethyl-4,4'-diaminodiphenylmethane, 3,3'5,5'-tetraisopropyl-4,4'-diaminodiphenylmethane and the like and mixtures thereof.

If desired, the "B" Component of the reaction systems of the invention may contain further chain extenders in addition to the aromatic polyamine present in Component B (ii) and any unreacted low molecular weight imino-functional or enamine containing compound present in Component B (i). Such further chain extenders suitably have molecular weights below 1000 and may be selected from polyols, for example glycols, aliphatic polyamines, for example diamines, and additional imines or enamines. The "B" Component may also contain other softblock materials, for example polyols or polyamines having molecular weights greater than 1000, or other polyimines or polyenamines having molecular weights greater than 1000.

Suitable polyols include those mentioned above in relation to the preparation of the prepolymer, especially polyether diols and/or triols. Suitable polyamines include the commercially available polyether diamines and triamines.

The reaction systems of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available from Goldschmidt A.G.). The amount of internal mould release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fiberglass reinforcement fibres, particularly those having lengths of from about 1/16 inch (0.16 cm) to about ½ inch (1.27 cm) and milled glass fibres having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams.

Other particularly suitable fillers are mica, fumed silica, flake glass, Wollastonite, calcium carbonate, carbon black, and the like.

The products of the present invention can be shaped into useful articles such as automobile fascias, or panels, by reaction injection moulding (RIM) process, which is performed in a RIM machine.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Krauss-Maffei GmbH, West Germany.

The reagents may be blended in a suitable container and agitated at a temperature from about 20° C. to about 100° C. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.20. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(—SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mould at a velocity from about 0.3 lb./sec. to about 70 lb./sec., preferably 5 to 20 lb./sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

Mould filling may be accomplished in this invention in a more facile manner due to the reaction profile of the systems disclosed herein. Generally there is an induction period of about 1 to 5 seconds, usually 1 to 3 seconds, during which the reaction between the isocyanate- and the imino-functional or enamine-containing ingredients is flat or retarded. Following this induction period the reaction accelerates noticeably. This behaviour is in sharp contrast to that of the primary aliphatic amines used in the prior art. These amines appear to begin reacting with aromatic isocyanates on contact. These reaction profiles can be visualised by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds and/or enamino compounds are reacted neat (i.e., free of other ingredients) with the aromatic isocyanates. Moulded objects can be demoulded after a mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

In a further aspect, this invention relates to polymeric foams and more especially to polymeric foams derived from organic polyisocyanates and to a method for their preparation.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m³ can be made.

The basic chemical reaction taking place in the production of polyurethane foams is between the isocyanate groups of a polyisocyanate and the hydroxyl groups of an organic polyol. It has now been found that useful polymeric foams may be prepared by reacting organic polyisocyanates with certain imino-functional or enamine-containing compounds.

Thus, according to the invention, there is provided a method for the preparation of polymeric foams which comprises reacting an organic polyisocyanate under foam-forming conditions with an imino-functional or enamine-containing compound having a molecular weight of at least 1000.

Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Organic polyisocyanates which may be used in the method of the invention include aliphatic, cycloaliphatic and araliphatic polyisocyanates, for example 1,6-hexamethylene diisocyanate, isophorone diisocyanate, cyclohexane-1,4-diisocyanate, 4,4'-dicyclohexylmethane diisocyanate and p-xylylene diisocyanate, but especially those aromatic polyisocyanates conventionally used in the manufacture of polyurethane and polyisocyanurate foams. Of particular importance are the tolylene diisocyanates (TDI) and diphenylmethane diisocyanates (MDI) in their various pure, modified and crude forms. Special mention may be made of the so-called MDI variants (diphenylmethane diisocyanates modified by the introduction of urethane, allophanate, urea, biuret, carbodiimide, uretonimine or isocyanurate residues) and crude MDI (polymethylene polyphenylene polyisocyanate mixtures).

Imino-functional compounds which may be used in the method of the invention are imino-functional compounds capable of reacting directly with polyisocyanates without prior cleavage of the C=N bond to form a monomeric by-product. It is, however, within the scope of the invention to make use of the in situ hydrolysis of imino-functional and/or enamine-containing compounds, regardless of their molecular weight, to produce volatile products which can be used to assist in the expansion of the foam.

Especially suitable imino-functional compounds include imino-functional polyether resins having molecular weights of at least 1500, preferably 2000 to 8000, and an average imino-functionality of at least 1.1, preferably from about 2 to about 4.

"Imino-functional" as used herein means that a reactant contains the grouping:

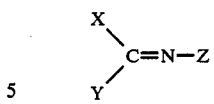

wherein X, Y and Z are chemical moieties which collectively form the rest of said compound and are each independently selected from hydrogen and organic radicals which are attached to the imino unit:

of said compound through N, C, O, S, Si or P, the central carbon atoms of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

It is well known to react polyisocyanates with polyimines in the presence of moisture whereby the purpose of the moisture is to hydrolyse the imine and liberate free amine which in turn reacts with the isocyanate present. This indirect process of reacting polyimines and polyisocyanates is described, for example, in European Pat. No. 149,765 to Arendt. As mentioned above, it is an optional feature of the invention to utilise the indirect process in the production of foams as a means of generating foam-forming gas.

The types of imino-functional compounds useful herein include (but are not limited to) the types previously described and exemplified as set forth in Table A.

Enamine-containing compounds which may be used in the method of the invention include compounds having the structures

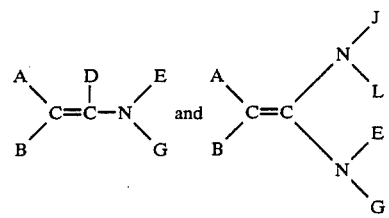

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

In many preferred enamino-functional compounds, E, G, J and L are not hydrogen. It is also preferred that not both of A and B are hydrogen. Especially useful enamino-functional compounds contain two or more enamino groups as a result of A, B, D, E, G, J and/or L being a radical terminating in one or more enamino groups.

Preferred enamino-functional compounds include enamino-functional polyether resins having molecular weights of at least 1500, especially 2000 to 8000 and an average enamine functionality of at least 1.1, preferably from about 2 to about 4.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproalde-hyde, cyclohexyl aldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945.

If desired, the imino-functional or enamine-containing compounds may contain amide, imide, thioether, siloxane or other linkages in addition to, or instead of, ether linkages provided that these are chemically inert towards the imino or enamine end groups.

The expression "foam-forming conditions" used herein means conditions already known for the formation of polymeric foams, for example polyurethane foams. Thus, the reaction mixture may contain dissolved or dispersed gases which may be injected therein or may be generated in situ by a chemical reaction or by the vaporisation of volatile liquids. Preferred reaction mixtures contain inert liquids having boiling points not exceeding 100° C., preferably not exceeding 50° C., at atmospheric pressure. As examples of such liquids, there may be mentioned hydrocarbons, chlorinated hydrocarbons, fluorinated hydrocarbons and chlorofluorocarbons.

A foam-forming gas may also be generated by including water in the reaction mixture, the water reacting with the polyisocyanate to produce carbon dioxide and/or with the imine or enamine to form volatile carbonyl compounds. When using imino-functional or enamine-containing ingredients which react rapidly with water under the conditions of storage or processing, any water employed may advantageously be introduced as a spearate stream at the time of reaction.

Alternatively, water may be incorporated in minor amounts (up to one mole or water per equivalent of the water-sensitive imino or enamine compound) into the same stream as the imino or enamine ingredients. Other types of imino-functional or enamine-containing compounds, for example oxazolines, imidazolines and guanidines, are less sensitive to hydrolysis and may be stored or processed in the presence of water without difficulty. The types of reactive functional groups which are stable in the presence of water will depend upon the conditions of processing and storage but this can be determined by trial without difficulty.

Reaction between the organic polyisocyanate and the imino-functional compound may be effected at normal or elevated temperatures. The foam-forming reaction mixtures may also contain other isocyanate-reactive materials in addition to the materials already mentioned. Examples of such materials include polyamines and polyols, for example those having molecular weights below 1000 already known as chain extenders. Polyols such as ethylene glycol, diethylene glycol, 1,4-butanediol, glycerol and triethyanolamine are particularly useful. By varying the proportions of imino-functional or enamine-containing compound and chain extender in the formulation, foams varying in texture from flexible to semi-rigid may be obtained. Further isocyanate-reactive materials which may be present in the foam-forming reaction mixture, for example as chain extenders, include imino-functional and/or enamine-containing compounds having molecular weights below 1000 and preferably containing one or two imino or enamine groups per molecule.

The method of the invention provides advantages in respect of processing speed, foam properties and internal mould release.

In addition to the ingredients already mentioned, the foam forming reaction mixture may contain one or more other conventional ingredients of such reaction mixtures. As examples of other such optional ingredients, there may be mentioned catalysts, surfactants, foam stabilisers, fire retardants, fillers, dyes, pigments and internal mould release agents.

Catalysts which may be used include materials already proposed as catalysts for isocyanate-based foam systems, for examples tertiary amines, tin compounds and alkali metal salts of carboxylic acids.

Surfactants and foam stabilizers which may be used include siloxane-oxyalkylene copolymers.

Thus, in a further aspect of the invention, there is provided a reaction system for use in the preparation of polymeric foams comprising:

(1) an organic polyisocyanate, and (2) an isocyanate-reactive component containing an imino-functional and/or enamine-containing compound having a molecular weight of at least 1000, a chain extender having a molecular weight below 1000 and a blowing agent.

By suitable choice of ingredients and concentration of blowing agents, the foams made by the method of the invention may be of high density (for example between about 60 kg/m$^3$ and about 200 kg/m$^3$) or low density (for example between about 20 and about 60 kg/m$^3$). Furthermore, the foams may be provided with fillers, reinforcements or facings of the types known in the art. By suitable choice of surfactant, density and processing conditions, the foams may be prepared so as to have open or closed cells or they may be plastic or elastomeric mouldings having integral skins.

Conventional techniques for controlling open cell content, cell size and skin (surface) quality may be used, the foams being produced, as desired, by moulding, spraying or free-rise methods.

In a further aspect, this invention provides reaction systems for use in making polymers by the reaction injection moulding process, said system comprising the following reaction components:

(A) an organic aromatic polyisocyanate; and (B) an isocyanate-reactive composition comprising at least one enamino-functional compound which has at least one enamino group that is directly reactive towards isocyanates and which conforms to the following structure

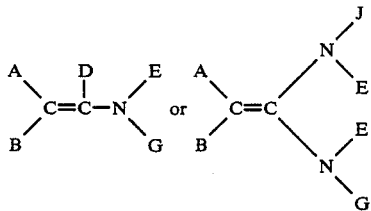

wherein each of A, B, D, E, G, J and L, independently, represents hydrogen or an optionally substituted hydrocarbon radical, and of A, B and D and, independently, and of E, G, J and L optionally being joined together to form one or more carbocyclic or heterocyclic rings.

In many preferred enamino-functional compounds, E, G, J and L are not hydrogen. It is also preferred that not both of A and B are hydrogen. Especially useful enamino-functional compounds contain two or more enamino groups as a result of any of A, B, D, E, G, J and/or L being a radical terminating in one or more enamino groups.

Suitable enamino-functional compounds may be obtained in known manner by reaction a carbonyl compound containing at least one alpha-hydrogen atom, for example an aliphatic, cycloaliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazine or secondary amino-terminated polymers such as polyethers.

General techniques for the synthesis of enamines have been described in, for example, Org. Coatings and Plastics Chem., 44, 151 and 157, (1981), ACS-PMSE preprints, August/September 1983, 456 and 461, and U.S. Pat. Nos. 4,342,841 and 4,552,945.

The organic polyisocyanates, component (A), useful in this invention suitably have a number-averaged isocyanate functionality from 1.8 to 4.0, preferably from 1.9 to 2.3, and a number-averaged molecular weight between about 120 and about 1800, preferably between about 170 and about 800. At least 50 mole percent, preferably at least 90 mole percent, of isocyanate groups in the species comprising the polyisocyanate are bonded directly to aromatic rings. At least 50 mole percent, preferably at least 70 mole percent, of the species comprising the polyisocyanate are diisocyanates.

Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Suitable aromatic polyisocyanates include, for example, p-phenylene diisocyanate; m-phenylene diisocyanate; 2,4-toluene diisocyanate; 2,6-toluene diisocyanate; naphthalene diisocyanate; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polydiphenylmethane diisocyanate having a functionality greater than 2, mixtures thereof and the like. The MDI isomers (2,4' and 4,4') and mixtures and derivatives thereof are most preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like.

Suitable uretonimine-modified polyisocyanates can be used and are prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols, which may include aminated polyols. Suitable polyols include, for example;

(a) polyether polyols and/or hydrocarbon-based polyols having a molecular weight from 60 to 500, and an average hydroxyl functionality from 1.9 to 2.5;

(b) polyether (and/or thioether) polyols having a molecular weight of at least 500, preferably 1000 or higher, and an average hydroxyl functionality from 1.9 to 4;

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4;

(e) amine terminated polyethers having a molecular weight of at least 1000, and an average amine hydrogen functionality from 1.9 to 8.

Examples of suitable polyether or hydrocarbon polyols having a molecular weight from 60 to 500 include propylene glycol; dipropylene glycol; tripropylene glycol; 2,3-butanediol; 1,3-butanediol, 2,2-dimethyl-1,3-propanediol and polypropylene glycols.

Examples of suitable polyether polyols having a molecular weight of at least 500, preferably 1000 or higher, include polyethylene glycols; poly-oxyethylene poly-oxypropylene copolymer diols; and polytetramethylene glycols, higher polypropylene glycols, polyoxypropylene triols, etc. The poly-oxypropylene based polyols are preferred.

Examples of suitable polyester polyols having a molecular weight from 100 to 1000 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols and/or oxyalkylene polyols, to form the corresponding polyalkylene and polyoxyalkylene esters or copolymers thereof having a molecular weight of at least 1000. The polybasic carboxylic acids used may be aliphatic, aromatic, or both.

Mixtures of several species from the above (a)–(e) and the like may be used to prepare prepolymers for use in the A component. Mixtures of species of type (b) with species of type (e) are preferred.

Examples of suitable amine terminated polyethers having a molecular weight of at least 1000 include polypropylene oxide triamines, polyoxypropylene diamines, and polyoxyethylene/polyoxypropylene copolymer diamines and triamines.

It is preferred that the (A) stream component contain a "softblock" prepolymer, i.e. a high (1000 or higher) molecular weight polyether and/or polyester segment. It is preferred that at least about one third, preferably at least 40%, by weight of the total softblock in the polymer be derived from the (A) component. High molecular weight aliphatic polyether species (i.e., categories (b) and/or (e) above) are preferred, particularly if the molecular weight of the species is about 2000 to 6000 and the reactive functionality is about 2 to about 8. The (A) stream can contain a carboxylic acid (e.g. a fatty acid such as lauric, stearic, palmitic, oleic, and the like) or latent acid (e.g. an anhydride of any of the preceding acids or cyclic acid anhydrides, such as cis-1,2-cyclohexane-dicarboxylic acid anhydride) to promote the reaction between the polyisocyanate and aliphatic enamino-functional ingredients from stream (B). The level of such acids can be about 0.01 to 4% by weight of the total polymer. The range of total softblock content in the polymer material (as a percent by weight of the total polymer) may range from about 10 to about 95%, preferably 20 to 80%, and most preferably 30 to 70%.

The B component of this invention is an isocyanate-reactive composition which comprises at least one enamino-functional compound capable of reacting directly with aromatic isocyanates, present as a softblock component and/or as a chain extender. If an enamino-functional compound is present as a chain extender, it will in general be an enamino-functional compound having a molecular weight less than 1000, preferably less than 600. If an enamino-functional compound is to be used in the softblock (or rubbery phase), it will in general be an enamino-functional aliphatic polyether resin with a molecular weight of at least 1000, preferably 2000 to 8000, and a number-averaged functionality of enamino groups at least 1.1, preferably from about 2 to about 4.

In a preferred embodiment this invention provides a reaction system used to make polyureas by a reaction injection moulding process, comprising (A) an aromatic polyisocyanate which has a number-averaged isocyanate functionality of from about 1.8 to about 4.0 and a number-averaged molecular weight of from about 120 to about 1800, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising
 (i) a chain extender comprising
  (a) 0–100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and, correspondingly,
  (b) 100–0% of an enamino-functional compound having a number-averaged molecular weight less than 1000 and a number-averaged functionality of isocyanate-reactive enamino units of about 1 to about 3, and
 (ii) an enamino-functional polyether resin having an average of from about 1.1 to about 5 isocyanate-reactive enamino groups per molecule and a number-averaged molecular weight of from 1000 to about 10,000, wherein said enamino groups constitute at least 50 mole percent of the isocyanate-reactive groups in said polyether resin, and at least 50 mole percent of said enamino-functional polyether species contain two or more enamino groups per molecule;

wherein said system is used to make a polymer by impingement mixing a stream comprising said reaction component (A) and a stream comprising said reaction component (B).

It is within the scope of the invention to have reactant B(ii) assume any weight fraction of the total B component. It is preferred, however, that the weight ratio of reactant B(i) to reactant B(ii) be in the range of about 9:1 to about 1:9, and most preferred that this ratio be in the range of 8:2 to 2:8.

It is preferred that the weight ratio of chain extender component B(i)(b) to chain extender component B(i)(a) be between about 0 and about 10, preferably between 0.1 and 5, and most preferably between 0.25 and 2.

It is further within the scope of the invention to use a softblock component in B(ii) which is not enamino functional in conjunction with an enamino functional chain extender, or to pre-react the (enamino functional or non-enamino functional) softblock component with a stoichiometric excess of the polyisocyanate "A" component, thereby forming an isocyanate-terminated prepolymer. In such an embodiment this invention provides a RIM reaction system comprising:

A. an aromatic polyisocyanate which has a number averaged isocyanate functionality of from about 1.8 to about 4.0 and a number-averaged molecular weight of at least about 120, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising
 (i) a chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and
 (ii) an enamino-functional chain extender having a molecular weight less than about 600 and a number-averaged functionality of enamino units between about 1 and about 2.5, said enamino groups being capable of reacting directly with isocyanates,
wherein the ratio by weight of component B(i) and B(ii) is between about 1:9 and about 9:1.

In a preferred embodiment this invention also provides a substantially moisture-free isocyanate-reactive composition comprising the following isocyanate-reactive components (i) an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines; and (ii) an enamine-terminated aliphatic polyether having an average of from about 1.1 to about 4 enamine groups per molecule and a number-averaged molecular weight of from about 1000 to about 10,000, wherein said enamine groups are capable of reacting directly with isocyanates, and wherein said enamine groups constitute at least 50 mole percent of isocyanate-reactive functional groups in said polyether and at least 50 mole percent of the enamine-terminated species comprising said mixture are di-enamines and/or tri-enamines, the weight ratio of said reactant (i) to said reactant (ii) being in the range of about 9:1 to about 1:9.

Another embodiment according to this invention provides a chain extender mixture, component B(i), comprising an aromatic polyamine and an enamino-functional chain extender capable of reacting directly with isocyanates, wherein said chain extender contains at least one isocyanate reactive enamino (C=N) unit per molecule and has a number-averaged molecular weight less than 1000, preferably between about 100 and about 600, wherein the reactive enamino groups conform to the range of structures defined hereinabove, and wherein the ratio by weight of said enamino functional chain extender to said aromatic polyamine in component B(i) is preferably between about 9:1 and 1:9, more preferably between 8:2 and 2:8.

This invention further provides polyureas and moulded articles made therefrom using the reaction systems and isocyanate-reactive compositions noted above.

"Reaction System" as used herein means a system or assemblage of reaction components which, in the system, are unreacted but which, in use, are reacted with each other in a device which provides for impingement mixing, to form a moulded product.

"RIM" as used herein refers to a reaction injection moulding process wherein the reactants, present as a polyisocyanate "A" component and an isocyanate-reactive "B" component, are impingement mixed and injected into a closed mould.

"Moisture free conditions" and "moisture free" as used above means that the reactants employed are substantially anhydrous and that the processing equipment used is also substantially anhydrous.

"Polymer", as used herein and in the claims, means the reaction product of a reaction system according to this invention. Such polymers contain at least one moiety or portion derived from the reaction of an isocyanate group with an enamine group. Such polymers can also contain other groups or linkages such as urethane, amide, urea, biuret, allophanate, triazine, and or isocyanurate groups.

"Directly reactive" as applied to the enamino functional compounds useful herein means that the enamino groups are capable of reacting with aromatic isocyanate groups in such a way as to form at least one chemical bond between the groups without prior cleavage or hydrolysis of the enamino groups. Hence, no by-products are produced in the reaction.

The term "polyisocyanate" encompasses mixtures comprising two or more species of isocyanate, as well as compositions consisting of a single polyisocyanate species. The terms "an aromatic polyamine", "an enamino-terminated aliphatic polyether" and "an enamino-functional chain extender" are used in like manner, i.e. to denote mixtures of species as well as single species thereof.

The terms "alkyl", "alkylene", and "aliphatic" used herein refer to cyclic as well as acyclic non-aromatic organic structures, i.e., structures or molecules which are free of aromatic rings and not part of aromatic rings.

The reaction systems of this invention are generally processed in bulk to form a high density polymer in a single step from the liquid monomeric components A and B. Generally, no solvent is used to moderate reaction rate. This does not, however, preclude the use of certain ingredients normally used in the processing of bulk thermosetting polyurethanes, polyureas, and related isocyanate-derived polymers of the prior art which are also prepared by impingement mixing. These additives are known to those skilled in the art, and includes monomeric liquids such as plasticizers, flame retardants, catalysts, volatile blowing agents and the like.

Component (B)(i) useful herein is in general a chain extender. Preferred chain extenders include aromatic polyamines, enamino-functional compounds having a molecular weight less than 1000, and mixtures thereof.

Aromatic polyamines useful as chain extenders in this invention have a number-averaged functionality of aromatically bound primary and/or secondary isocyanate reactive amine groups of from about 1.8 to about 3.0, preferably from 1.9 to 2.2, and a number averaged molecular weight which ranges from about 100 to about 500, preferably between 122 and 300. At least about 50 mole percent, preferably at least 80 mole percent, of the species comprising said polyamine are diamines. Preferably, at least about 95 mole % of amine groups, whether primary or secondary, are aromatically bound.

Examples of suitable aromatic polyamines include 3,5-diethyl-2,4-toluenediamine; 3,5-diethyl-2,6-toluenediamine; DETDA which is a mixture of about 80 percent by weight 3,5-diethyl-2,4-toluenediamine and about 20 percent by weight 3,5-diethyl-2,6-toluenediamine; 1,3,5-triethyl-2,6-diaminobenzene; 2,4-diaminotoluene; 2,6-diaminotoluene; 2,4'-diamino-diphenylmethane; 4,4'-diamino-diphenylmethane; 3,3'-dimethyl-5,5'-diethyl-4,4'-diaminodiphenylmethane; phenylmethane; 3,3',5,5'-tetraisopropyl-4,4'-diamino diphenyl-methane polyphenyl-polymethylene polyamines; and the like.

It is also possible to employ, in component B(i), in addition to or in place of the aromatic polyamines noted above, between 0 and 100% by weight, based on the total weight of B(i), of low molecular weight enamino-functional species having a molecular weight less than 1000 wherein each such enamino-functional species contains at least one enamino unit per molecule. Preferably such enamino-functional species have a number-averaged molecular weight less than 600 and a number-averaged functionality of enamino units between about 1.2 and about 2.5. Examples of preferred compounds are aliphatic polyether or hydrocarbon resins terminated with aliphatic enamine groups which can be made in facile manner by reacting a low molecular weight secondary amino-terminated resin with an aldehyde or ketone.

Aliphatic low molecular weight polyamine compositions may also be employed, in minor amounts not exceeding 40% by weight based upon the total weight of ingredients B(i)+B(ii), preferably less than 20%, more preferably less than 10%, and most preferably less than 1%, as an optional chain extender in stream (B). Useful aliphatic amines contain acyclic, linear or branched chains of atoms between reactive (primary and/or secondary) amine groups. These amine groups (by definition) are bonded directly, via the amine nitrogen atom, to aliphatic carbon atoms of the connecting structure. The number-averaged molecular weight of the aliphatic polyamine (or mixture of aliphatic polyamines used in this invention is less than about 1000, preferably between 200 and 450. The number averaged isocyanate-reactive amine functionality is between 1 and 3, preferably between 2 and 2.3. The aliphatic polyamine composition should preferably be at least 50 mole percent, preferably at least 70 mole percent, diamines.

It is preferred that the aliphatic amine composition be substantially free of individual (reactive amine-containing) molecular species of molecular weight less than 170. If molecular amine species of molecular weight lower than 170 are present, they should constitute less than 20% by weight of the total aliphatic amine composition, and less than 5% of the total polyurea composition (by weight, relative to the total weight of reactive components).

It is preferred that a majority of any primary aliphatic amine groups within the aliphatic amine composition, most preferably greater than 80% of these primary amine groups, are bonded directly (via the amine nitrogen atom) to secondary and/or tertiary carbon atoms.

Examples of suitable aliphatic polyamines include the amine-terminated polyethers such as those represented below:

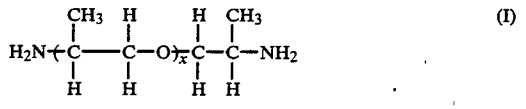

wherein x has an average value between 2 and about 6.

Polyether diamines such as Formula I, above, may be used as mixtures with higher functionality polyether polyamines such as Formula II (below), provided that the mixture meets the requirements of number averaged amine functionality and molecular weight described previously:

$$\text{CH}_3-\text{CH}_2-\text{C}(\text{CH}_2-(\text{O}-\text{CH}_2-\text{CH}(\text{CH}_3)-)_z-\text{NH}_2)_3 \quad \text{(II)}$$

wherein z has an average value between about 1 and about 2.

Component (B) (i) may also contain imino-functional compounds having molecular weights less than 1500. Such compounds contain at least one isocyanate-reactive imino group per molecule and conform to the general structure:

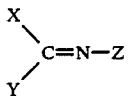

wherein

X, Y, and Z are chemical moieties which collectively form the rest of said compound and are each independently selected from the group consisting of H and organic radicals which are attached to the imino unit

of said compound through N, C, O, S, Si or P;

being the central carbon atom of said imino nit is bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through an atom selected from C, N, and O. It is most preferred that X, Y and Z are attached through saturated atoms, preferably aliphatic carbon atoms.

Many types of imino-functional compounds are useful as co-reactants in this invention, including (but not limited to) the types previously described and exemplified as set forth in Table A.

The preferred enamino-terminated polyethers used as component (B) (ii) herein can be made by reacting an aldehyde or ketone having at least one alpha-hydrogen atom with a secondary amino-terminated polyether having an appropriate molecular weight to give an enamino-functional polyether having a molecular weight of from 1500 to about 10,000. Particularaly suitable polyethers comprise polyoxypropylene chains terminating in 2 or 3 secondary amino groups.

The polyether based resins used to prepare component B(ii) may also contain groups other than ether linkages. For example, amide linkages, thioether linkages, imide linkages, siloxane linkages, and so forth, provided that these are chemically inert towards the aliphatic enamine end groups.

Suitable enamino-terminated polyethers may also be prepared by reacting ketone-terminated polyethers containing alpha hydrogen atoms (obtained by the oxidation of polyether polyols) with secondary amines, for example morpholine or piperidine.

Other suitable enamino-terminated polyethers have, for example, the general structure:

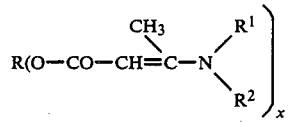

wherein R is the residue remaining after removal of the hydroxyl group from a polyether polyol, R' represents hydrogen or optionally substituted hydrocarbon radical, $R^2$ represents hydrogen or an optionally substituted hydro-carbon radical or R' and $R^2$ together with the attached nitrogen atom form a heterocyclic ring, and x is an integer from 2 to 5, especially 2 or 3. These enamino-terminated polyethers may be prepared by reacting polyether polyols, for example polyoxypropylene diols or triols with ethyl acetoacetate and then reacting the product with ammonia, a primary amine $R'NH_2$ or a secondary amine $R'R^2NH$.

The enamino-terminated polyether preferably has a number-averaged enamine functionality of from about 1.6 to about 3, and the enamine groups comprise at least 50 mole percent, preferably at least 70 mole percent, of isocyanate-reactive functional groups present therein.

It is further preferred that the number-averaged molecular weight of the enamine-terminated polyether softblock be between 2000 and 8000, and that the polyether be substantially free of components having a molecular weight less than about 1000. It is further preferred that at least 70 mole percent of the enamine-terminated molecules comprising the polyether be di-enamines and/or tri-enamines.

In addition to the enamino-functional polyethers described above, the reaction system stream (B) may also contain supplemental higher molecular weight isocyanate-reactive hydrogen-containing material. A preferred group of active hydrogen-containing materials useful as optional softblock resins have an average molecular weight of at least 1000, preferably at least 2000 up to about 10,000, an average active hydrogen group functionality from 2 to 6, preferably from 2 to 3, active hydrogen-containing groups wherein at least 70 percent, preferably at least 85 percent, of the groups are primary and/or secondary aliphatic and/or aromatic amine groups. The amount of these supplemental high-molecular-weight isocyanate-reactive materials in component B should be less than 50% by weight of the amount of component B(ii), preferably less than 25%, and most preferably less than 10%. The ratio of the number of active hydrogen containing groups in this supplemental high-molecular-weight resin to the number of enamine and/or imino groups in component B(ii) is less than 0.5, preferably less than 0.25, and most preferably less than 0.1:1.

Examples of suitable supplemental high molecular weight active hydrogen-containing materials include amine terminated polyethers, amine terminated organopolysiloxanes, amine terminated polymers with hydrocarbon main chain, amine terminated polyamides, and the like. Suitable amine terminated polyethers have a molecular weight of about 1000 to about 10,000, and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixtures or as blocks of one or the other polyether. Normally, the amination step does not completely replace all of the hydroxyl groups. For use in the invention, compounds having at least 70 percent of the hydroxyl groups converted to primary and/or secondary amine groups are preferred and those having at least 85 percent are most preferred. Amination of the polyol may be accomplished by a large number of prior art methods, for example, by reductive ammination or by cyanoethylation followed by hydrogenation of the nitrile end groups.

If it is desired to reductively amminate a polyethylene oxide polyol, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,654,370, incorporated herein by reference.

A single high molecular weight amine terminated polyether may be used. Also, mixtures of amine terminated Polyethers such as mixtures of di- and tri-functional materials and/or different molecular weights or different chemical composition materials may be used.

Suitable amine terminated organopoly siloxanes include, for example, those represented by the polysiloxane material PS-513, which is commercially available from Petrarch Systems Inc. This is a linear polydimethyl siloxane fluid which contains terminal aminopropyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the polymers commercially available from B. F. Goodrich as HYCAR ATBN $1300 \times 16$ and HYCAR ATBN $1300 \times 21$.

Stream (B) may further comprise hydroxyl-containing species such as one or a mixture of polyols which have an average molecular weight of at least 1000 and an average hydroxyl functionality from 2 to 8. The total of hydroxyl groups amount to less than 30 percent, equivalents basis, of the enamino plus imine groups in component B(ii), preferably less than 15 percent. Examples of suitable high molecular weight polyols include, for example, hydroxyl terminated polyoxypropylene; polyoxypropylenepolyoxyethylene copolymers; polyoxypropylenepolyoxybutylene copolymers; and polytetramethylene oxide diols. The amount, by weight, of these polyols should not exceed 50% of the weight of the enamine-terminated polyether resin (B-ii), and preferably should be less than 25%, most preferably less than 10%, of the weight of B(ii).

Other species which may be present in the B stream include imino-functional resins having an average of from about 1.1 to about 5 isocyanate-reactive imino groups (as hereinbefore defined) per molecule and molecular weights of from 1000 to about 10,000. Examples are imino-functional polyethers, having molecular weights of from about 1000 to about 8000 and from about 2 to about 5 imino units per molecule. These may be obtained by reacting polyether polyamines, especially polyoxypropylene primary diamines or triamines, with aldehydes or ketones.

The reaction systems of the present invention can further include additives such as internal release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available from Goldschmidt AG). The amount of internal mould release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fibreglass reinforcement fibres, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams. Other particularly suitable fillers are mica, fumed silica, flake glass, Wollastonite, calcium carbonate, carbon black, and the like.

The reaction systems and polymers of this invention are mixing activated systems which are processed by the reaction moulding (RIM) process in a RIM machine. The invention provides improved control (improved flow characteristics and improved mixing quality) in fast reacting, fast gelling systems. Accordingly, the invention is directed to reaction systems having gel times, under the conditions of processing, less than about 1 minute, preferably less than 30 seconds, more preferably less than 20 seconds, and most preferably less than 10 seconds. The reaction systems of this invention can be used to make polyureas which are shapable by RIM into useful articles such as automobile fascia and panels.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Krauss Maffei GmbH, West Germany.

The reagents may be blended in a suitable container and agitated at a temperature from about 20° C. to about 100° C.

It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the enamine-isocyanate reaction. The temperature of the "B" Component can be between about 20° C. to about 80° C., but is preferably about 20° C. to about 40° C.

The "A" Component and "B" Components are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3 1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.20. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(—SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

Mould filling may be accomplished in this invention in a more facile manner due to the reaction profile of the systems disclosed herein. Generally there is an induction period of about 1 to 5 seconds, usually 1 to 3 seconds, during which the reaction between the isocyanate- and the enamino-functional ingredients is flat or retarded. Following this induction period the reaction accelerates noticeably. This behaviour is in sharp contrast to that of the primary aliphatic amines used in the polyurea systems of the prior art. These amines appear to begin reacting with aromatic isocyanates on contact. These reaction profiles can be visualised by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the enamine compounds are reacted neat (i.e., free of other ingredients) with the aromatic isocyanates. Moulded objects can be demanded after a mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

In addition to polyurea RIM, the flow and property advantages and the resulting improvements in processability provided by the reaction systems of the invention make then well suited for use in mat reinforced structural/RIM systems (SRIM). In these systems, a continuous mat of reinforcing fibers is placed in the mould and the reaction system is pumped through and around this mat, thereby providing a composite with mechanical reinforcement. The flow requirements for SRIM can therefore be quite demanding. The mats are generally made of glass fibres, but metallic fibres, afraid fibres, carbon fibres, Nylon fibres, combinations of these, and the like may be used. The individual fibres can be quite long relative to reinforcements which can be incorporated via individual component monomer streams, comparable to or longer than the moulded part itself when fully extended. The polyurea systems of the invention are well suited to the demanding process requirements of SRIM.

In a further aspect, the present invention provides a reaction system for use in making a reaction injection moulded elastomer, said system comprising the following components:

(A) a polyisocyanate comprising a polyisocyanate having a molecular weight greater than 600 of the general formula:

$$T_m(R)_n \qquad (1)$$

wherein T represents a chain of more than 30 atoms, m represents an integer of at least 1, R represents and isocyanate group containing residue and n is an integer of at least 2, at least one of the residues represented by R containing at least 2 isocyanate groups separated one from another by a chain of from 2 to 30 atoms and the sum of the residues represented by R constituting less than 50% of the total molecule on a weight basis, and (B) an isocyanate-reactive component comprising an imino-functional compound and/or an enamine-containing compound.

References herein to the number of atoms present in a chain indicate the number of atoms present in the backbone of a chain but not hydrogen atoms or other substituents attached to backbone atoms. Thus, in a poly (propylene oxide) chain, the carbon and oxygen atoms constituting the backbone of the chain are counted but not the attached hydrogen atoms or the atoms present in the methyl substituents.

Unless otherwise stated, the expressions "equivalent weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

As examples of the types of chain represented by T in the polyisocyanates of Formula 1, there may be mentioned polyesters, polyesteramides, polycarbonates, polythioethers, polyacetals, polyolefins, hydrocarbons, polysiloxanes and, especially, polyethers.

The polyisocyanates of Formula 1 preferably have molecular weights greater than 1800 with each T being a chain of more than 70, preferably more than 100, atoms in length, wherein the isocyanate-containing residues are located at the ends of the chains. Especially preferred polyisocyanates have molecular weights in the range 2,500 to 10,000. It is also preferred that the ratio of the molecular weight of the polyisocyanate of Formula 1 to the number of isocyanate group containing residues R in the molecule is not less than 800, more preferably not less than 1000 and most preferably not less than 1200. It is desirable that at least two of these contain at least two isocyanate groups per residue with a preferred maximum of four isocyanate groups in any residue. The overall isocyanate equivalent weight of the polyisocyanates of Formula 1 is preferably not less than 500, more preferably not less than 750 and most preferably not less than 850. The isocyanate groups within an isocyanate group containing residue are suitably separated by a chain of not more than 25 atoms. Preferably, the polyisocyanate of Formula 1 constitutes at least 10%, preferably greater than 20% of the weight of the total polyisocyanates.

Examples of polyisocyanates of Formula 1 include products obtained by reacting polymeric polyols with organic polyisocyanates under conditions such that the initially formed urethane-modified polyisocyanates are converted to allophanate-modified polyisocyanates terminating in isocyanate group containing residues of the formula:

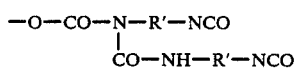

wherein R' represents a divalent hydrocarbon residue.

Organic polyisocyanates which may be used in the preparation of the allophanate-modified polyisocyanates include aliphatic, cycloaliphatic and araliphatic polyisocyanates, for example hexamethylene diisocyanate, isophorone diisocyanate, cyclohexane-1,4'-diisocyanate, dicyclohexylmethane-4,4'-diisocyanate and p-xylylene diisocyanate. The preferred polyisocyanates, however, are the aromatic polyisocyanates, for example phenylene diisocyanates, tolylyene diisocyanates, 1,5-naphtylene diisocyanate and especially the available MDI isomers, that is to say 4,4'-diphenylmethane diisocyanate, 2,4'-diphenylmethane diisocyanate and mixtures thereof. Whilst diisocyanates are the preferred polyisocyanates for use in the preparation of the polyisocyanates of Formula 1, mixtures of diisocyanates with minor proportions of higher functionality polyisocyanates may be used if desired. Thus, MDI variants such as uretonimine-modified MDI may be used.

Polymeric polyols which may be used in the preparation of the allophanate-modified polyisocyanates preferably have average nominal hydroxyl weights in the range 750 to 5000. Particularly preferred polymeric polyols have average hydroxyl equivalent weights in the range from about 1000 to about 3000. Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

In preparing the allophanate-modified polyisocyanates, the polyisocyanate and the polyol may be reacted together using conditions that have been fully described in the prior art for the production of urethane prepolymers. Thus, one or more polyisocyanates may be reacted with one or more polyols under substantially anhydrous conditions at temperature between about 50° and about 110° C., optionally in the presence of catalysts, until the formation of urethane groups by reaction between the isocyanate groups and the hydroxyl groups is substantially complete. Reaction between the urethane groups and the excess of polyisocyanate is then allowed to take place so that at least about 20%, preferably at least 50%, and optionally up to 100% of the initially formed urethane groups are converted to allophanate groups. This process may be assisted by catalysis. Suitable catalysts known in the polyurethane art and include tin compounds such as dibutyltin dilaurate and sulphonic acids. It is preferable to avoid those catalysts which, under the conditions of prepolymer formation promote competing isocyanate reactions such as trimerisation.

In preparing the allophanate-modified polyisocyanates, the organic polyisocyanate and the polyol are suitably reacted in such proportions that the initial NCO/OH is at least about 2:1, preferably greater than about 5:1. One convenient method of preparing the compositions involves adding the polyol gradually to the total amount of organic polyisocyanate so as to minimise chain extension.

Examples of other polyisocyanates of Formula 1 include products obtained by reacting polymeric polyamines with organic polyisocyanates under conditions such that the initially formed urea-modified polyisocyanates are converted to biuret-modified polyisocyanates terminating in isocyanate group containing residues of the formula:

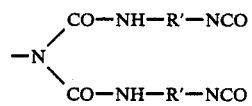

wherein R' is as defined above.

Organic polyisocyanates which may be used in the preparation of the biuret-modified polyisocyanates include those mentioned above with reference to the preparation of the allophanate-modified polyisocyanates. Polymeric polyamines which may be used particularly include polyether triamines and, especially, polyether diamines having average amino equivalent weights in the range 500 to 5000, preferably from about 1000 to about 3000. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred.

In preparing the biuret-modified polyisocyanates, the organic polyisocyanate and the polyamine may be reacted together using conditions similar to those described above for the preparation of the allophanate-modified polyisocyanates.

Examples of further polyisocyanates of Formula 1 include products obtained by reacting organic polyisocyanates, for example those already mentioned, with imino-functional or enamine-containing compounds having molecular weights of at least 1000.

"Imino-functional" as used herein means that a compound contains the grouping:

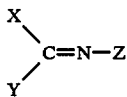

wherein X, Y and Z are chemical moieties which collectively form the rest of said compound and are each independently selected from hydrogen and organic radicals which are attached to the imino unit: of said compound through N, C, O S, Si or P, the central carbon atom of said imino unit being bonded to three atoms, said compound being capable of reacting directly with polyisocyanates without prior cleavage the C=N bond to form a monomeric byproduct.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

Suitable imino-functional compounds include imino-functional polyether resins having molecular weights of at least 1000, preferably 2000 to 8000 and an average imino functionality of at least 1.1, preferably from about 2 to about 4.

Many types of imino-functional compounds are useful in the preparation of polyisocyanates of Formula 1, including (but not limited to) the types previously described and exemplified as set forth in Table A.

Enamine-containing compounds which may be used in the preparation of the polyisocyanates of Formula 1 include compounds having the structures:

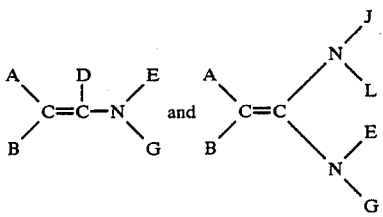

wherein each of A, B, D, E, G and L, independently, represents hydrogen or an optionally substituted hydrocarbon radical, any of A, B and D and, independently, any of E, G, J and L optionally being joined together to form one or more carbocyclic or heterocyclic rings.

In many preferred enamino-functional compounds, E,G, J, and L are not hydrogen. It is also preferred that not both of A and B are hydrogen. Especially useful enamino-functional compounds contain two or more enamino groups as a result of any of A, B, D, E, G, J and/or L being a radical terminating in one or more enamino groups.

Preferred enamino-functional compounds include enamino-functional polyether resins having molecular weights of at least 1000, preferably 2000 to 8000 and an average enamine functionality of at least 1.1, preferably from about 2 to about 4.

Suitable enamino-functional compounds may be obtained in known manner by reacting a carbonyl compound containing at least one-hydrogen atom, for example an aliphatic, cyclo-aliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cycolpentanone, cyclohexanone, trimethylcyclohexanaone, mixtures of these and the like with a secondary amine, for example a secondary amino-terminated polymer such as a polyether.

General techniques for the synthesis of enamines have been described in, for example, Org. coatings and Plastics Chem., 44, 151 and 157, (1981), ACS-PMSE preprints, August/September 1983, 456 and 461, and U.S. Pat. Nos. 4,342,841 and 4,552,945.

If desired, the imino-functional or enamine-containing compounds may contain amide, imide, thioether, siloxane or other linkages in addition to, or instead of, ether linkages provided that these are chemically inert towards the imino or enamine end groups.

In preparing polyisocyanates of Formula 1, the organic polyisocyanate and imino-functional and/or enamine-containing compound are reacted together at ambient or elevated temperatures, optionally in the presence of catalysts. The organic polyisocyanate and the imino-functional and/or enamine-containing compound are suitably reacted in a molar ratio of at least about 3:1, preferably greater than about 6:1. One convenient method of preparing the compositions involves adding the imine or enamine gradually to the total amount of organic polyisocyanate so as to minimise chain extension.

If desired, polyisocyanates of Formula 1 may be prepared by reacting organic polyisocyanates with mixtures of any of the above mentioned polyols, polyamines, imino-functional compounds and/or enamine-containing compounds.

Further polyisocyanates of Formula 1 may be obtained by the reaction of a stoichiometric excess of an organic polyisocyanate, especially the diisocyanates mentioned above, with an isocyanate-reactive compound having a molecular weight greater than 600 of the general formula:

$$V_p(W)_q \qquad (2)$$

wherein V represents a chain of more than 30 atoms, p represents an integer of at least 1, W represents an isocyanate-reactive group containing residue and q is an integer of at least 2, at least one of the residues represented by W containing at least 2 isocyanate-reactive groups separated one from another by a chain of from 2 to 10 atoms and the sum of the residues represented by W constituting less than 50%, preferably less than 25% of the total molecule on a weight basis.

As examples of the types of chain represented by V in the isocyanate-reactive compounds of Formula 2, there may be mentioned polyesters, polyesteramides, polycarbonates, polythioethers, polyacetals, polyolefins, polysiloxanes and, especially, polyethers.

The isocyanate-reactive compounds of Formula 2 preferably have molecular weights greater than 1800 with each V being a chain of more than 70, preferably more than 100, atoms in length, wherein the isocyanate-reactive group containing residues are located at the ends of chains. Especially preferred isocyanate-reactive compounds have molecular weights in the range 2,000 to 10,000. It is also preferred that the ratio of the molecular weight of the isocyanate-reactive compound of Formula 2 to the number of isocyanate-reactive group containing residues W in the molecule is not less than 800, more preferably not less than 1000 and most preferably not less than 1200. It is desirable that at least two of these contain at least two isocyanate-reactive groups per residue with a preferred maximum of four isocyanate-reactive groups in any residue. The overall equivalent weight, with respect to the total number of isocyanate-reactive groups, is preferably not less than 500, more preferably not less than 750 and most preferably not less than 850.

Isocyanate-reactive groups which may be present in the isocyanate-reactive compounds of Formula 2 include, for example, hydroxyl, thiol, carboxyl, primary and secondary amino groups and mixtures thereof. The isocyanate-reactive groups within an isocyanate-reactive group containing residue are preferably separated by a chain of not more than 5 atoms.

Examples of isocyanate-reactive compounds of Formula 2 include polyols obtained by end-capping polyether polyols with glycidol.

The A component of the reaction systems of the invention may also contain other polyisocyanates in addition to polyisocyanates of Formula 1 although it is most preferred that the polyisocyanates of Formula 2 constitute at least 25% of the A component on a weight basis. Other polyisocyanates which may be present include the organic polyisocyanates mentioned above as starting materials in the preparation of polyisocyanates of Formula 1.

The B components of the reaction systems of the invention are isocyanate-reactive compositions comprising at least one imino-functional and/or enamine-containing compound present as a chain extender and/or as a softblock component.

Imino-functional and/or enamine-containing compounds suitable as chain extenders typically have molecular weights below 1000, especially between about 100 and about 600. In other respects, for example structure, they may have the characteristics of the higher molecular weight imino-functional or enamine-containing compounds described above. The preferred imino and/or enamine group functionality of the chain extender is between 1 and about 3.

Examples of preferred imino-functional compounds for use as chain extenders in the reaction systems of the invention include simple aldimines and/or ketimines such as may be obtained by reacting aldehydes, for example formaldehyde, acetaldehyde, propionaldehyde, n-butyraldehyde, isobyturaldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, methyl n-propyl ketone, methyl isopropyl ketone, diethyl ketone, benzyl methyl ketone or cyclohexanone and mixtures thereof with primary amines, especially aliphatic amines. Examples of suitable amines include hexamethylene diamine, menthane diamine, isophorone diamine, xylylene diamine, 2-methylpentamethylene diamine, low molecular weight polyoxyalkylene diamines and/or triamines and mixtures of such amines. Primary mono-amines may also be used either alone or together with diamines.

Examples of suitable enamine-containing chain extenders are described in U.S. Pat. Nos. 4,342,841 and 4,552,945. Other examples include the bis-enamines formed by reacting piperazine with simple carbonyl compounds such as acetone, methyl ethyl ketone, cyclohexanone and the like.

When present as a softblock component, the imine or enamine will generally have a molecular weight of at least 1500, preferably 2000 to 8000, and an average imino or enamino functionality of at least 1.1, preferably from about 2 to about 4. Such compounds have already been described herein.

If desired, the B component may contain further chain extenders and/or softblock components in addition to imino-functional and/or enamine-containing compounds. Such further chain extenders include polyols and polyamines having molecular weights below 1000, especially below 500. Polyols which may be present as chain extenders include simple non-polymeric diols such as ethylene glycol and 1,4-butanediol whilst polyamines which may be used as chain extenders include aliphatic, cycloaliphatic or araliphatic polyamines containing two or more primary and/or secondary amino groups and, especially, aromatic polyamines.

Aromatic polyamines useful as chain extenders in the reaction systems of the invention particularly include diamines, especially those having molecular weights from about 100 to about 400, preferably between 122 and 300. Suitable diamines have been fully described in the prior art and include 3,5-diethyl-2,4-toluendiamine, 3,5-diethyl-2, 6-to-luenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5, 5'-diethyl-4,4'-diaminodiphenylmethane, 3,3',5,5'-tetraisopropyl-4,4'-diaminodiphenylmethane and the like and mixtures thereof.

Additional softblock materials which may be present in the B component include polyols and polyamines having molecular weights greater than 1500. Suitable polyols include those mentioned above in relation to the preparation of the allophanate-modified polyisocyanates, especially polyether diols and/or trios. Suitable polyamines include the commercially available polyether diamines and/or triamines.

Any isocyanate-reactive materials defined by Formula 2 may optionally be included in components B.

Especially valuable B components for use in the reaction systems of the invention are isocyanate-reactive compositions comprising:

(i) a chain extender comprising:
   (a) 0–100% of an aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, and, correspondingly, (b) 100-0% of an imino- and/or enamino-functional aliphatic compound having from about 1 to about 3 isocyanate=reactive imino and/or enamine groups per molecule and a molecular weight less than 1000, and (ii) an imino- and/or enamine functional polyether having an average of from about 1.1 to about 5 isocyanate-reactive imino and/or enamine groups per molecule and an average molecular weight of from 1000 to about 10,000 and wherein said imino and/or enamine groups constitute at least 50 mole per cent of the isocyanate-reactive groups in said polyether and at least 50 mole per cent of said imino- and/or enamino-functional polyether species contain 2 or more imino and/or enamine groups per molecule.

The reaction systems of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available from Goldschmidt AG. The amount of internal mould release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine: heterocyclic amines such as N-alkylmorpholines which include, for example, N-methylmorpholine, N-ethylmorpholine; 2,2'-bis(dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Another group of catalysts, which are more specific for the isocyanate-amine reaction, and particularly for the reaction of isocyanates with aliphatic imines or enamines, include carboxylic acids and precursors thereof (such as acid anhydrides). Specific examples of carboxylic acid catalysts include oleic acid, 1,12-dodecanedioic acid, isophthalic acid, and the like.

These types of catalysts are described in U.S. Pat. Nos. 4,499,254; 4,487,908; and 4,487,912; and in U.S. Pat. No. 3,789,045 (for the imine-isocyanate rxn.)

Suitable surfactants include, for example, sodium salts of castor oil sulfonates; alkali metal or ammonium salts of sulfonic acids such as dodecyl benzene sulfonic acid and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fibreglass reinforcement fibres, particularly those having lengths of from about 1/16 inch (0.16 cm) to about ½ inch (1.27 cm) and milled glass fibres having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams. Other particularly suitable fillers are mica, fumed silica, flake glass, Wollastonite, calcium carbonate, carbon black, and the like.

The products of the present invention can be shaped into useful articles such as automobile fascias, or panels, by reaction injection moulding (RIM) process, which is performed in a RIM machine.

RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Kraus Maffei GmbH, West Germany.

The reagents may be blended in a suitable container and agitated at a temperature from about 20° C. to about 100° C. It is preferred to mix and process the ingredients of component (B) at or near ambient (20° C.) temperature.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.10. This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(—SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mould at a velocity from about 0.3 lb./sec. to about 70 lb./sec., preferably 5 to 20 lb./sec. The mould is heated to a temperature from about 20° C. to 250° C. Suitable moulds are made of metal such as aluminium or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

Mould filling may be accomplished in a more facile manner due to the reaction profile of the imino and/or enamine reagents. Generally there is an induction period of about 1 to 5 seconds, usually 1 to 3 seconds, during which the reaction between the isocyanate- and the imino or enamine ingredients are flat or retarded. Following this induction period the reaction accelerates noticeably. This behaviour is in sharp contrast to that of the primary aliphatic amines used in polyurea systems of the prior art. These amines appear to begin reacting with aromatic isocyanates on contact. These reaction profiles can be visualised by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds are reacted neat (i.e., free of other ingredients) with the aromatic isocyanates. Moulded objects can be demoulded after a mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20 with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

The reaction systems of the invention may also be used in the production of foams having densities in the range 10–400 kg/m$^3$ with the addition, as necessary, of the usual blowing agents, catalysts, surfactants and the like.

The invention is illustrated but not limited by the following Examples in which all parts, percentages and ratios are by weight unless otherwise indicated. In the Examples, Flexural Modulus was determined by ASTM D790;

Following is a list of materials employed in the Examples and comparative experiments.

A prepolymer having an isocyanate content of 4.5% was prepared by reacting an 80/20 mixture of 4,4'- and 2,4'-diphenylmethane diisocyanate with a polyoxypropylene triol having a molecular weight of 5000. An isocyanate-reactive composition was prepared by stirring 25.0 parts of the thus obtained prepolymer with 25.0 parts of a diimine prepared from cyclohexanone and a polyoxypropylene diamine of molecular weight of 400. 50.0 parts of DETDA were added to the isocyanate-reactive composition to give "B" component B1.

A prepolymer having an isocyanate content of 4.0% was prepared by reacting the MDI isomer mixture described above with a polyoxypropylene triol having a molecular weight of 5000. An isocyanate-reactive composition was prepared by stirring 33.3 parts of the thus obtained prepolymer with 33.3 parts of a diimine prepared from cyclohexanone and 2-methyl-1, 5-pentanediamine. 33.3 parts of DETDA were added to the isocyanate-reactive composition to give "B" component B2.

50 parts of "B" component 1 were mixed with 50 parts of "B" component 2 to give isocyanate-reactive "B" component B3.

A prepolymer having an isocyanate content of 2.1% was prepared in cyclohexanone solution by reacting the MDI isomer mixture described for Prepolymer 1 with a polyoxypropylene triol having a molecular weight of 5000. The cyclohexane was removed by evaporation. An isocyanate-reactive composition was prepared by stirring 30.3 parts of the thus obtained prepolymer with 30.3 parts of a diimine prepared from cyclohexanone and a polyoxypropylene diamine of molecular weight 400. 30.4 parts of DETDA were added to the isocyanate-reactive composition to give "B" component B4.

Isocyanate prepolymer P1 having an isocyanate content of 14.7% was prepared by reacting 53.4 parts of the MDI isomer mixture described above with 46.6 parts of a polyoxypropylene diamine having a molecular weight of 2000.

Isocyanate prepolymer P2 having an isocyanate content of 14.3% was prepared by reacting 42.3 parts of the MDI isomer mixture described above with 23.9 parts of a polyoxypropylene diamine having a molecular weight of 2000, 23.9 parts of an ethylene oxide capped polyoxypropylene triol having an ethylene oxide content of 15% and a molecular weight of 5250 and 10 parts of a uretonimine modified variant of pure 4,4'-MDI having an NCO content of 29.5%.

Isocyanate prepolymer P3 having an isocyanate content of 17.3% was prepared by reacting 56.14 parts of the MDI isomer mixture described above with 43.86 parts of a polyoxypropylene diol having a molecular weight of 2000.

Isocyanate prepolymer P4 having an isocyanate content of 15.1% was prepared by reacting 28.62 parts of polyoxypropylene glycol 2000 with 36.42 parts of an 80/20 mixture of 4,4'- and 2,4'-diphenylmethane diisocyanates for two hours at 115° C.

In the Examples, elastomers were prepared on a Battenfeld SHK-65 RIM machine at a mould temperature of 90° C.

The isocyanate prepolymers and "B" components were impingement mixed in the proportions stated in Table 1.

The following table gives the physical properties of the foams obtained together with the properties of foams obtained from a comparable formulation based on a polyether triol (molecular weight 5000) in place of the triimine.

TABLE B

| PROPERTY | TRIIMINE | TRIIMINE | POLYOL |
|---|---|---|---|
| isocyanate index | 110 | 110 | 110 |
| density (kg/m$^3$) | 242 | 240 | 245 |
| hardness (Shore A) | 52 | 50 | 50 |
| indentation hardness (kg force) | 6.9 | 5.8 | 10.0 |
| tensile strength (MPa) | 2.5 | 2.4 | 2.2 |
| elongation at break (%) | 90 | 99 | 90 |
| tear strength (N/m) | 3000 | 3040 | 2800 |
| minimum demould time (sec) | 150 | 150 | 120 |

EXAMPLE 14

Preparation of an enamino-functional polyether

TABLE 1

| | \multicolumn{8}{c}{Examples} |
|---|---|---|---|---|---|---|---|---|
| | 1 | 2 | 3 | 4 | 5 | 6 | 7 | 8 |
| pbw of isocyanate prepolymer | 190 pbw P1 | 209 pbw P4 | 196 pbw P2 | 215 pbw P2 | 179 pbw P1 | 196 pbw P1 | 185 pbw P2 | 203 pbw P2 |
| pbw of "B" component | 100 pbw B1 | 100 pbw B1 | 100 pbw B1 | 100 pbw B1 | 100 pbw B3 | 100 pbw B3 | 100 pbw B3 | 100 pbw B3 |
| Flexural Modulus (MPa) | 843 | 900 | 853 | 769 | 813 | 827 | 724 | 671 |
| Elong. (%) | 59 | 59 | 83 | 70 | 36 | 26 | 49 | 41 |
| Heat Sag (150 mm O/H, 160° C.)30' | 10.5 | 4.0 | 1.0 | 11 | 3 | 8 | 6.5 | 1 |
| (mm) 60' | 20.5 | 19 | 2.0 | 29 | 13 | 18.5 | 17.5 | 5 |
| Impact (J) | | | | | | | | |
| +20° C. | 39 | 38 | 45 | 36 | 75 | 65 | 60 | 63 |
| −20° C. | 18 | 19 | 15 | 26 | 31 | 34 | 58 | 36 |

| | \multicolumn{8}{c}{Examples} |
|---|---|---|---|---|---|---|---|---|
| | 9 | 10 | 11 | 12 | 13 | 14 | 15 | 16 |
| pbw of isocyanate prepolymer | 153 pbw P3 | 168 pbw P3 | 164 pbw P1 | 180 pbw P1 | 169 pbw P2 | 185 pbw P2 | 164 pbw P4 | 180 pbw P4 |
| pbw of "B" component | 100 pbw B3 | 100 pbw B3 | 100 pbw B4 | 100 pbw B4 | 100 pbw B4 | 100 pbw B4 | 100 pbw B2 | 100 pbw B2 |
| Flexural Modulus (MPa) | 724 | 721 | 744 | 821 | 816 | 840 | 890 | 900 |
| Elong. (%) | 88 | 61 | 59 | 40 | 37 | 25 | 15 | 10 |
| Heat Sag (150 mm O/H, 160° C.)30' | 10 | 9 | 1.5 | 1.0 | 1 | 2 | 4 | 8 |
| (mm) 60' | 26 | 18.5 | 8.5 | 1.0 | 2.5 | 3 | 8 | 12 |
| Impact (J) | | | | | | | | |
| +20° C. | 64 | 72 | 32 | 33 | 32 | 25 | 18 | 7 |
| −20° C. | 41 | 36 | 23 | 24 | 20 | 15 | 11 | 5 |

The invention is further illustrated but not limited by the following Example in which all parts and percentages are by weight.

EXAMPLE 13

A polyol blend was prepared by mixing 100 parts of a tri-imine (prepared by reacting a polyoxypropylene triamine having a molecular weight of 5000 with cyclohexanone), 8 parts of ethylene glycol, 0.1 part of DABCO 33LV and 15 parts of trichlorofluoromethane. This blend was combined with a uretoniminemodified diphenylmethane diisocyanate at an isocyanate index of 110 by mixing at ambient temperature for 10 seconds at 5000 rpm.

After a cream time of 14 secs, a string time of 37 secs and an end of rise time of 74 secs, a flexible foam was formed.

a. Preparation of poly(oxypropylene) acetoacetate

A 10 l round bottomed flask in a temperature controlled heating mantle was fitted with a mechanical stirrer, a nitrogen sparge and a vigreux column with Liebig condensor. The flask was charged with 9000 g of a 5000 molecular weight poly(oxypropylene)triol based on glycerol, 782 g of ethylacetoacetate and 3 ml of tetrabutyltitanate catalyst. The reaction mixture was heated to 160°–170° C. with a gentle sparge of nitrogen. The progress of reaction was monitored by infrared analysis of the condensed volatiles produced during the reaction. After 440 minutes, a further 500 g of ethylacetoacetate and 2 ml of tetrabutyltitanate were added to the reaction mixture. After 690 minutes a sample of distillate contained mainly ethanol as indicated by a peak at 3350 cm$^1$ in the infrared spectrum of the sample. After 810 minutes the vigreux column was removed and heating was continued. Analysis of the distillate at this point showed this material to be mainly ethylacetoacetate. The excess ethylacetoacetate was then removed by the application of vacuum.

After all of the volatile components had been removed the product was shown the be have a hydroxyl value of 3.5 MgKOH/g indicating greater than 90% conversion to the poly(oxypropylene)acetoacetate.

b. Preparation of a poly(oxypropylene)-(N-cyclohexyl)aminocrotonate

A 10 l round bottomed flask in a temperature controlled heating mantle was fitted with a mechanical stirrer, a nitrogen sparge and a Dean-Stark apparatus. The flask was charged with 9454 g of the poly (oxypropylene)acetoacetate of example 1a, 536 g of cyclohexylamine and 500 g of toluene. The reaction mixture was heated to reflux and water was collected in the Dean-Stark trap.

After 670 minutes the reaction was considered to be complete as indicated by the absence of further water in the Dean Stark trap. Excess cyclohexylamine and toluene were removed by the application of vacuum. The presence of the aminocrotonate was clearly indicated in the spectra of the product. The infrared spectrum showed absorptions at 1650 and 1610 cm$^{-1}$ corresponding to the N—C=C and C=O groups. The $^{13}$C n.m.r. spectrum, in CDCl$_3$ with TMS as reference showed resonances at delta-170 ppm and delta-160 ppm and delta=83 ppm corresponding to the N—C=C, O—C=O and N—C=C carbon atoms respectively.

EXAMPLE 15

Reaction of an enamine-functional polyether with an isocyanate prepolymer

A prepolymer having an isocyanate content of 15.5% was prepared by reacting 22.9 pbw of an all propylene oxide polyether triol having an OH value of 33–35 was added to 44.3 pbw of a stirred 80/20 mixture of 4,4' and 2,4' diphenylmethane diisocyanates. After completion of the polyol addition 22.9 pbw of a polyether diamine (Jeffamine D-2000) were slowly added to the reaction mixture (T=85°–90° C.). After this the reaction mixture was stirred at 90° C. for another 3 hours. Subsequently the prepolymer was cooled down to 45° C. and 9.10 pbw of a uretonimine modified diphenylmethane diisocyanate having an isocyanate content of 29.5% was added. Stirring was continued at this temperature for 15 minutes after which the prepolymer was allowed to cool down to ambient temperature. A clear, yellow liquid product was obtained.

A "B" component was prepared comprising 50 parts of the enamine-functional polyether of example 1, 50 parts of DETDA and 2.5 parts of zinc stearate. Elastomers were prepared by combining respectively 176 (example 15a) and 193 pbw (example 15b) of the prepolymer with 100 pbw of the "B" component on a Battenfeld SHK-65 RIM machine at a mould temperature of 90° C.

Properties of the elastomer products thus obtained are stated below:

|  | Example 15a | Example 15b |
|---|---|---|
| Flexural Modulus (MPa) | 731 | 722 |
| Tensile Strength (KPa) | 24048 | 23972 |
| Elong. (%) | 45 | 44 |
| Heat Sag |  |  |
| (150 mm O/H, 160° C.) 30' | 25 | 11 |
| (mm) 60' | 36 | 16 |
| Impact (J) |  |  |
| +20° C. | 31 | 41 |
| −20° C. | 22 | 19 |

Flexural Modulus was determined by ASTM D790, Heat Sag was determined by ASTM D3769-85, Impact (Falling Dart) was determined by ASTM D3024-84.

The invention is further illustrated by the following Examples in which all parts, percentages, and ratios are by weight unless otherwise indicated. In the Examples, Flexural modulus was determined by ASTM D-3769-85 and Impact (falling weight) was determined by ASTM D3029-84.

EXAMPLE 16

Prepolymer 1 was prepared by reacting 43.9 parts of polypropylene glycol 2000 with 56.1 parts of an 80/20 mixture of 4,4'- and 2,4'-diphenylmethane diisocyanates at 115° C. for 2 hours. The prepolymer so obtained had an NCO content of 16.0%.

EXAMPLE 17

Prepolymer 2 was prepared by reacting 43.9 parts of polypropylene glycol 2000 with 56.1 parts of an 80/20 mixture of 4,4'- and 2,4'-diphenylmethane diisocyanates in the presence of 0.002 part of dibutyltin dilaurate at 115° C. for 2 hours. The allophanate containing prepolymer so obtainied had an NCO content of 14.1%.

EXAMPLE 18

A series of elastomer products were prepared on a Battenfeld SHK-65 machine by reacting the prepolymers of examples 16 and 17 with a number of "B" components, using the RIM technique. As "B" components use was made of the following isocyanate reactive compositions:

Imine Composition A
70 pbw of T-5000* cyclohexanone imine
* T-5000 is the Texaco "Jeffamine" polyether triamine.
30 pbw of DETDA The relative amounts of prepolymers ("A" component) and isocyanate reactive compositions ("B" component) are stated in the following table 2A. The temperature of the mould was maintained at approximately 90° C.

The properties of the elastomer products thus obtained are indicated in the following Table 2B.

TABLE 2

Preparation of elastomer products by the RIM technique.

A: Amounts of "A" and "B" components

| Example No. | 18a | 18b | 18c | 18d |
|---|---|---|---|---|
| Component "A" | PREPOLYMER 1 | PREPOLYMER 1 | PREPOLYMER 2 | PREPOLYMER 2 |
| (parts/weight) | 105 | 115 | 119 | 129 |
| Component "B" | IMINE COMP. A | IMINE COMP. A | IMINE COMP. A | IMINE COMP. A |

TABLE 2-continued

Preparation of elastomer products by the RIM technique.

| (parts/weight) | 100 | 100 | 100 | 100 |
|---|---|---|---|---|
| B: Properties of the elastomer products obtained ||||||
| Example No. | 18a | 18b | 18c | 18d |
| DENSITY (Kg/m$^3$) | 1112 | 1117 | 1110 | 1125 |
| FLEXURAL MODULUS (MPa) | 284 | 342 | 381 | 402 |
| HARDNESS (SHORE D) | 58 | 63 | 66 | 65 |
| TENSILE STRENGTH (KPa) | 21983 | 26396 | 23900 | 23111 |
| ELONG. AT BREAK (%) | 221 | 195 | 153 | 135 |
| IMPACT (J) | | | | |
| +20° C. | 77 | 84 | 66 | 83 |
| −20° C. | 58 | 60 | 64 | 60 |

What is claimed is:

1. An active hydrogen-containing composition comprising the following isocyanate-reactive components:
   (i) an aromatic polyamine having a number-averaged functionality af aromatically bound primary and.or secondary amine groups of from about 1.8 to about 3.0, a number-averaged molecular weight of from about 100 to about 400, and wherein at least 50 mole percent of the species comprising said polyamine are diamines; and
   (ii) an enamine-terminated aliphatic polyether having an average of from about 1.1 to about 4 enamine groups per molecule and a number-averaged molecular weight of from about 1000 to about 10,000 wherein said enamine groups constitute at least 50 mole percent of isocyanate-reactive functional groups in said polyether and at least 50 mole percent of the enamine-terminated species comprising said mixture are di-enamines and/or tri-enamines, the weight ratio of said reactant (i) to said reactant (ii) being in the range of about 9:1 to about 1:9.

2. A composition according to claim 1, comprising at least 55 weight percent of component (i) and component (ii).

3. A composition according to claim 1 and wherein said aliphatic polyether contains an average of about 1.6 to about 3 enamine groups per molecule.

4. A composition according to claim 1 wherein said enamine-terminated polyether has an number-averaged molecular weight between 2000 and 8000 and is substantially free of enamine-containing polyethers having a molecular weight less than 1000.

5. A composition according to claim 1 wherein enamine groups constitute at least 70 mole percent of isocyanate-reactive functional groups present in said enamine-terminated polyether.

6. A composition according to claim 1 wherein at least 70 mole percent of said aliphatic enamine-terminated polyether consists of di-enamines and/or tri-enamines.

* * * * *